Figure 4:
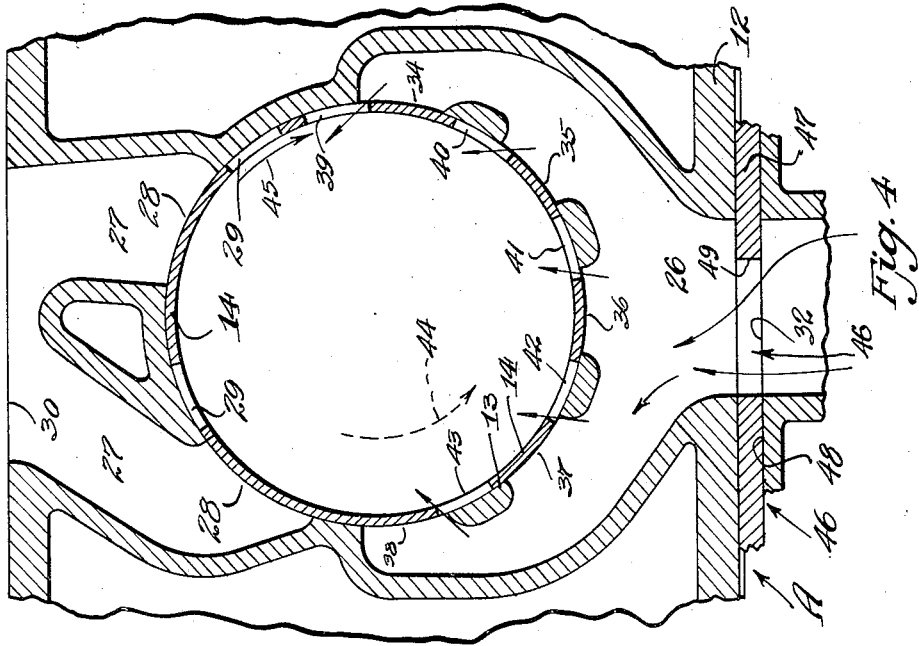

Dec. 29, 1936.　　　A. J. MEYER　　　2,065,600
INTERNAL COMBUSTION ENGINE AND METHOD OF OPERATING SAME
Filed Nov. 27, 1931　　　2 Sheets-Sheet 1
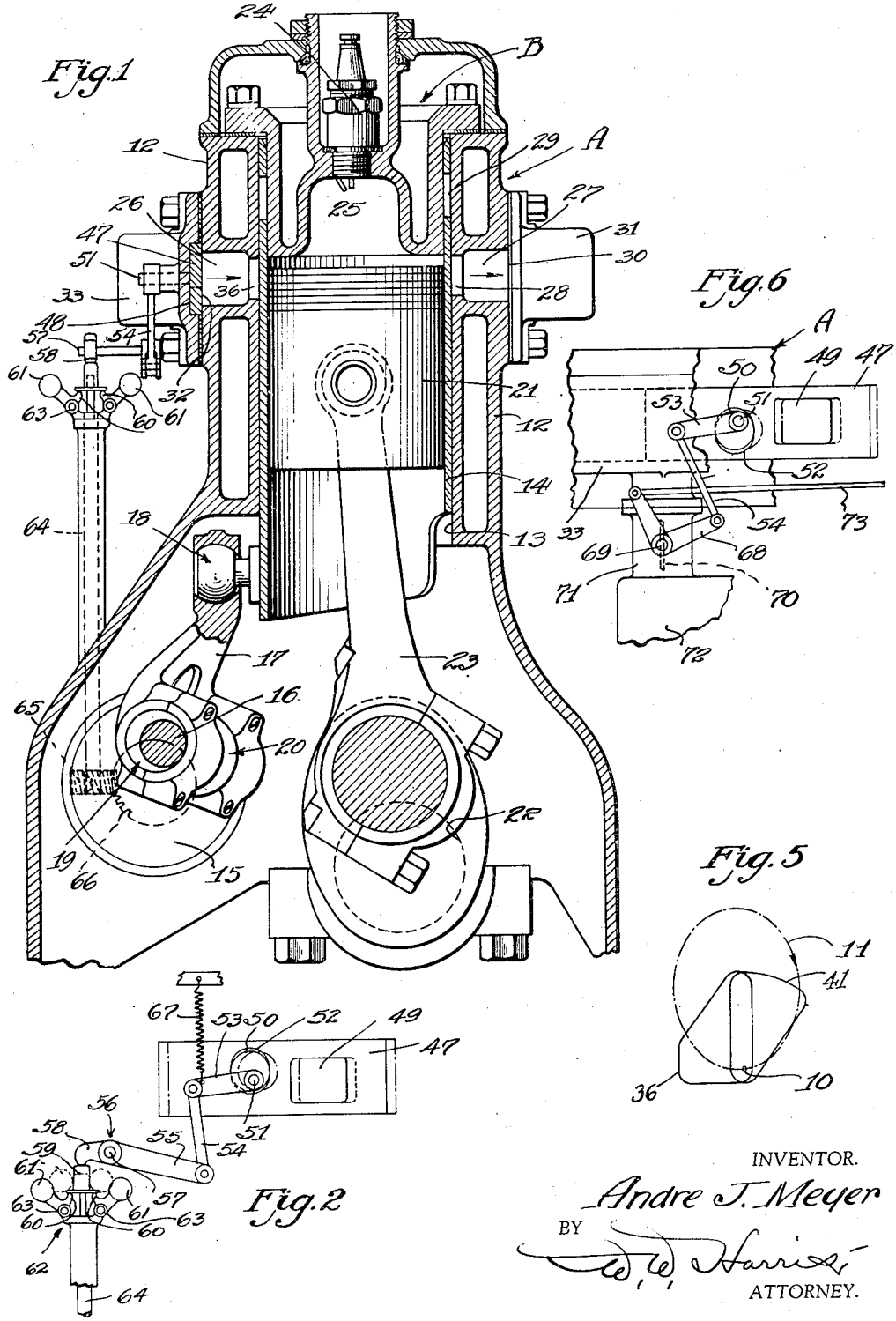
INVENTOR.
Andre J. Meyer
BY 
ATTORNEY.

INVENTOR.
Andre J. Meyer
BY
ATTORNEY.

Patented Dec. 29, 1936

2,065,600

UNITED STATES PATENT OFFICE 2,065,600

INTERNAL COMBUSTION ENGINE AND METHOD OF OPERATING SAME

Andre J. Meyer, Detroit, Mich., assignor to Continental Motors Corporation, Detroit, Mich., a corporation of Virginia Application November 27, 1931, Serial No. 577,428

34 Claims. (Cl. 123—81)

This invention relates to internal combustion engines and methods of operating same and refers more particularly to engines of the sleeve valve type.

My invention is particularly related to the single sleeve valve engine of the combined movement type wherein a single sleeve valve associated with each cylinder is given a combined axial reciprocation and oscillation in performing the valving functions, any point on the sleeve tracing a closed curve path with respect to the cylinder. In this type of engine there is a tendency for the fluid such as gasoline and air commonly referred to as fuel mixture, or air in the case of a compression ignition engine, to swirl about the combustion chamber, the swirl being an important element for obtaining the best performance characteristics of the engine.

In engines of the aforesaid single sleeve valve type the cooperating cylinder and sleeve intake ports open largely during the oscillating component of the sleeve valve travel with the result that the fuel mixture is introduced tangentially into the cylinder or combustion chamber giving rise to a swirling motion of the fuel mixture about an axis parallel and in many cases coincident with the sleeve and cylinder axis.

Now the aforesaid swirl of the fuel mixture is important in obtaining improved characteristics of the engine, such as power, fuel economy, freedom from detonation, torque, etc., but as the swirl is increased as the engine speed and velocity of the fuel mixture intake gases increase, difficulties and disadvantages have been experienced heretofore in the lack of controlling the swirl to the desired amount or degree to obtain the greatest benefits therefrom and also maintaining substantially the same amount of swirl over the range of engine speed.

It is an object of my invention to provide novel methods and means for controlling the swirl in engines of the aforesaid type and while great benefits may be derived by my invention in the aforesaid single sleeve valve type of engine it is not my intention to so limit the scope of my invention since in the broad aspects thereof my invention is applicable to engines having other types of valving devices.

It is a further object of my invention to provide novel methods and means for obtaining and/or controlling the swirl over substantially the entire range of engine performance.

A still further object of my invention resides in the provision of simple and effective methods and means for controlling the swirl to great advantage in internal combustion engines and for maintaining a substantially constant speed of swirl over the range of engine speeds.

In carrying out the objects of my invention I have provided, in the specific embodiments illustrated, an orifice device for variably directing the fuel mixture toward selective groups of intake ports of each cylinder to regulate or control the swirl which, in the aforesaid type of single sleeve valve engine occurs chiefly by reason of the aforesaid tangential entry through the ports. I am enabled by my invention to obtain a predetermined desired amount of swirl which will be maintained substantially constant over the customary ranges of engine speeds. I have arranged the aforesaid orifice device as a shiftable element in association with the fuel mixture stream, this device being controlled by the engine speed as by utilizing a governor control, or by the throttle valve or mechanism controlling the throttle valve, or by other suitable means. Since the position of the throttle valve is not always in definite relationship with the engine speed, such arrangement constitutes a compromise in some instances in approaching the fullest benefits of my invention but since, in most instances engine speed is proportional to throttle valve setting, such arrangement for practical purposes is entirely satisfactory.

By reason of my invention the fuel mixture stream for each cylinder is directionally controlled for selective groups of intake ports of the associated cylinder whereby all factors at any engine speed which tend to establish fuel mixture swirl are compensated for and controlled as aforesaid. My invention is a decided advantage over devices which endeavor to slow down the swirl after it is established, since with such devices I have determined that an excessive swirl once established is difficult if not impossible to effectively and accurately control and also since such devices do not compensate or adjust themselves to conditions of varying engine speeds such as are met with in automotive vehicle practice. Furthermore, by reason of my invention I am enabled to utilize intake chambers symmetrically arranged with respect to the associated groups of intake ports.

In engines of the aforesaid type I have determined that the inherent tendency for the fuel mixture to swirl increases substantially in proportion to increases in engine speeds and in carrying out my invention in the illustrated embodiment the orifice device for low engine speed promotes engine swirl to the desired degree, this swirl being maintained with increasing engine speeds by compensating for the tendency for the swirl to increase in angular velocity. This compensation is effected by a shifting of the orifice and consequently the fuel mixture stream so as to establish a counter-swirl tendency sufficient to compensate for the tendency for swirl increase.

In actual practice my illustrated form of swirl control by movable fuel mixture orifice is very effective and in practice I have obtained a variation of from zero to 20,000 revolutions per minute (R. P. M.) of swirl at 1500 R. P. M. of engine crankshaft speed in a four stroke cycle single sleeve valve engine by selectively moving my orifice over a distance of $\frac{7}{8}$ of an inch. In my accompanying illustrations the movement of the orifice plate is therefore somewhat exaggerated for purposes of clear showing.

In actual practice the orifice plate is adjusted for each engine speed until the best setting for swirl conditions is obtained and then by means of suitable cams, linkages, and the like the orifice plate is adjusted from some engine part or other part associated therewith related to engine speed whereby at various engine speeds the orifice plate is automatically adjusted to the previously established setting as will be readily understood. It is not necessary to measure the swirl at any engine R. P. M. in order to obtain the desired setting of the orifice plate since engine power, fuel economy, detonation, and like factors resulting from swirl characteristics may be readily noted in the usual well known ways. However, I have determined by experiment, the various swirl speeds which occur over engine ranges with the use of a light, sensitive vane rotor having a rotatable shaft projecting outside the engine combustion chamber, the shaft providing an accurate means for counting the R. P. M. of the vane located within the combustion chamber. While the most favorable R. P. M. of swirl will vary with different types and sizes of engines, I have found that swirl for ordinary gasoline mixture ranging in the neighborhood of 3000 to 5000 R. P. M. is very beneficial in ordinary sizes of single sleeve valve engines, such as are used in the automotive industry.

Figure 3:
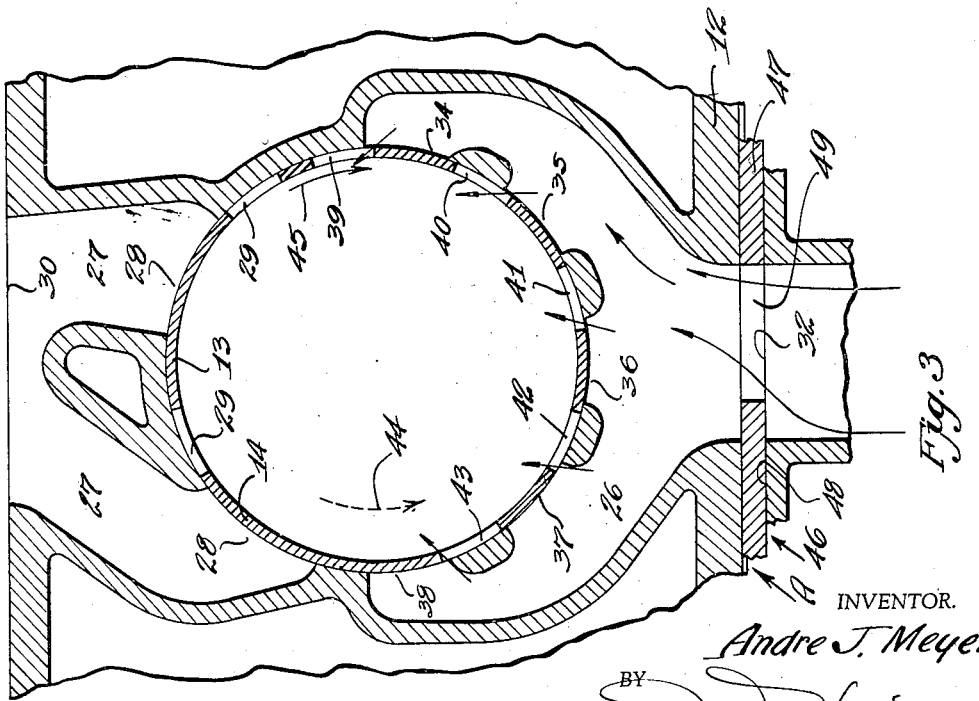

Further objects and advantages of my invention will be apparent as this specification progresses reference being made to the accompanying drawings in which:

Fig. 1 is a sectional elevation view through a typical cylinder of the engine,

Fig. 2 is a detail elevation view showing the governor control for the orifice plate, Fig. 3 is a sectional plan view through a typical cylinder in the region of the ports and illustrating the orifice plate in one position of adjustment, Fig. 4 is a like view illustrating the orifice plate in another position of adjustment, Fig. 5 is a detail view illustrating a typical pair of cylinder and sleeve intake ports and sleeve travel, and Fig. 6 is a detail view illustrating a modified form of orifice plate control by utilizing the throttle valve mechanism.

In the drawings reference character A represents the internal combustion engine herein shown for purposes of illustrating my invention as the four stroke cycle single sleeve valve type, commonly known as the Burt-McCollum type of engine wherein a single sleeve valve associated with each cylinder is given a combined axial reciprocation and oscillation in performing the cyclical events of the engine, any point such as 10 on the sleeve tracing a closed curve path 11 shown in Fig. 5.

The engine A has a cylinder block 12 formed with the customary spaced bores or cylinders 13 only one of which is shown to avoid duplication. The cylinder 13 receives the sleeve valve 14 driven as aforesaid in any desirable manner as by the wobble valveshaft 15 driven at half crankshaft speed for the four stroke cycle engine illustrated. This valveshaft has a wobble crank 16 for each sleeve valve, the wobble crank being connected to the sleeve by link 17, ball and socket structures 18, 19 and 20 permitting the movement necessary to drive the sleeve valve with the aforesaid motion. Many other types of drives are well known in the art and such driving mechanism per se is not a part of this invention. Within the sleeve valve 14 is the usual piston 21 operating the crankshaft 22 through the connecting rod 23. The outer end of the cylinder is closed by a cylinder head structure B carrying spark plug 24 and providing a combustion chamber 25 preferably of the type lending itself to axial swirling of the carbureted fuel mixture of gasoline and air or other fluid to be conducted into the combustion chamber.

The cylinder block 12 is formed at opposite sides thereof with the fuel mixture intake and exhaust chambers 26 and 27 respectively, the exhaust chamber 27 directing or conducting exhaust gases from cylinder and sleeve exhaust ports 28 and 29 respectively to the chamber outlet 30 and exhaust manifold 31 when these ports coincide at the proper time. The intake chamber 26 conducts fuel mixture from the branch outlet 32 of intake manifold 33 to the plurality of cylinder intake ports 34, 35, 36, 37 and 38 spaced circumferentially of cylinder 13 in the wall thereof. The cylinder intake ports respectively open to the cooperating sleeve valve intake ports 39, 40, 41, 42, and 43 at the proper time of the sleeve valve travel, as when the sleeve valve motion is largely oscillatory, illustrated in Fig. 5. In Figs. 3 and 4 the cylinder and sleeve intake ports are shown opening by the respective vertical edges of the ports whereby the fuel mixture tends to enter the cylinder or combustion chamber tangentially to produce a swirling motion of the fuel mixture in a direction indicated by arrow 44 opposite to the oscillatory sleeve motion indicated by arrow 45. While I have shown five cylinder and intake ports I desire it to be understood that other numbers of ports may be used if desired, it being often customary in this type of engine to provide three intake ports.

With the ports arranged as thus far described the ports 39, 40, and 41 tend to introduce the fuel mixture tangentially to provide counterclockwise swirl (viewed as in Figs. 3 and 4) and the ports 42 and 43 tend to produce opposing clockwise swirl, the first group predominating to provide a net swirl indicated by arrow 44. With increasing engine speed and accompanying increased velocity of the fuel mixture stream in manifold branch 32 and intake chamber 26 this counter-clockwise swirl greatly increases so that in the absence of controlling factors graduated to engine speeds the maximum benefits of the swirl cannot be realized. Thus, if the swirl at higher speeds is of a speed affording the most desirable conditions of engine operation, then at lesser speeds the resulting decreasing swirl speeds result in engine power loss and other attendant inefficiencies compared to what can be obtained and realized with proper swirl conditions. Likewise if the swirl is obtained for maximum benefits at low engine speeds, then at higher engine speed the greatly increased swirl speeds will result in detonation, engine roughness and other undesirable engine characteristics.

I have provided a method and means for obtaining desired swirl conditions selectively and preferably automatically over the range of engine speeds, the embodiments illustrated selectively directing the fuel mixture stream toward groups of intake ports in a manner promoting swirl at low engine speeds and gradually opposing swirl as the engine speeds increase, the rate of opposing swirl being sufficient to substantially offset the rate of swirl increase whereby to substantially maintain the most desirable constant swirl speed over the range of engine speeds. Thus interposed across the fuel mixture stream as between the manifold branch outlet 32 and the intake chamber 26 I have provided a deflecting or orifice device 46 herein consisting of an orifice plate 47 longitudinally movable or slidable in recess 48, it being understood that this plate 47 extends for the engine length so as to cooperate with each outlet 32 for which purpose the plate has an orifice 49 of less lateral width than outlet 32, the manifold branches being of sufficient size to offset the otherwise tendency toward restricting the fuel mixture flow. In Fig. 3 the orifice plate is moved to the right whereby the fuel mixture stream is directed as indicated by the arrows toward ports 34 and 35 so as to greatly favor these swirl promoting ports and produce at such setting for a given relatively low engine speed the most desirable condition of engine performance. As the engine speed increases the plate 47 is gradually shifted to the left favoring more and more the ports 37 and 38 which oppose the counter-clockwise swirl until in Fig. 4 I have illustrated the plate setting for maximum engine speed, the fuel mixture stream being directed as indicated by the arrows toward the left group of intake ports, although even at such setting the next swirl tendency results in the desired counter-clockwise swirl to substantially the same degree or speed as obtained at low engine speed with the plate 47 positioned as in Fig. 3. The central port 36 which is customarily a swirl inducing port, has its characteristics altered by my invention so as to reduce its tendency toward counter-clockwise swirl.

In Figs. 1 and 2 I have illustrated one manner of moving the orifice plate 47 in response to engine speeds, although if desired the plate 47 may be manually adjusted or fixed, as in the case of constant speed engines or engines operating over small ranges of speeds. Thus, the most favorable setting of the orifice plate for given engine speeds having been determined as hereinbefore stated, the plate is moved in adjustment for the corresponding speeds by the cam 50 rotatable with shaft 51, the cam acting within and on the cam track 52 formed in the plate 47. Since the tendency toward swirl increase is substantially proportional with increasing engine speeds this cam 50 may assume the form of an eccentric for substantially realizing the uniform swirl characteristics over the engine speed range. The shaft 51 is rocked by a lever 53 which in turn is actuated by link 54 and arm 55 of lever 56 pivoted at 57, the other arm 58 being moved by the plunger 59 acted upon by the bell crank ends 60 of the balls 61 of the governor device 62. The governor balls 61 pivot at 63 to the drive shaft 64 which is geared to a moving engine part such as the gears 65 and 66 respectively connected to the drive shaft 64 and the valve-shaft 15. A spring 67 maintains the linkage mechanism in responsive control from the governor 62.

In Fig. 6 the link 54 is actuated by bell crank lever 68 which is pivoted at 69 to actuate the usual fuel mixture throttle valve 70 in riser 71 between carburetor 72 and intake manifold 33. The bell crank lever 68 is manually actuated by rod 73 extending to a convenient means of control such as the usual accelerator or throttle customary in motor vehicles where the engine is being used for vehicle propulsion.

I desire it understood that my deflector or orifice means may be fixed if desired instead of manually or automatically moved as aforesaid. Thus, for certain uses of engines where substantially constant speed is desired my fuel mixture deflector may be secured in a fixed position favorable to such speed. In such instances the deflector may, if desired, be formed as an integral part of the fuel mixture conducting system. Furthermore, in order to obtain a compromise swirl condition over a range of engine speeds my deflector may be set in a fixed position. Such conditions may be desirable in engine production to avoid the expense of the movable orifice plate even though such expense is relatively small.

It is not my intention to limit the scope of my invention to the embodiments illustrated as various modifications and deviations therefrom within the scope of my invention will be apparent from the teachings of my invention.

What I claim as my invention is:

1. In an internal combustion engine having a cylinder provided with a plurality of intake ports spaced circumferentially in the wall thereof, a single sleeve valve associated with said cylinder and having a combined axial reciprocation and oscillation, said sleeve valve having a plurality of intake ports spaced circumferentially in the wall thereof and adapted to register with the cylinder intake ports, intake gas conducting means for directing intake gas toward said cylinder and sleeve valve intake ports, said intake gas having a tendency to swirl in said cylinder, and intake gas deflecting means associated with said conducting means for cooperation with a plurality of said cylinder and sleeve intake ports for controlling said swirling tendency, said intake gas conducting means being at all times in communication with all of said cylinder intake ports, said deflecting means acting on said intake gas to promote swirl at relatively low engine speed.

2. In an internal combustion engine having a cylinder provided with a plurality of intake ports spaced circumferentially in the wall thereof, a single sleeve valve associated with said cylinder and having a combined axial reciprocation and oscillation, said sleeve valve having a plurality of intake ports spaced circumferentially in the wall thereof and adapted to register with the cylinder intake ports, fuel mixture conducting means for directing fuel mixture toward said cylinder and sleeve valve intake ports, said fuel mixture having a tendency to swirl in said cylinder, orifice means associated with said conducting means for controlling said swirling tendency whereby to obtain substantially constant speed of swirl over variations in engine speed.

3. In an internal combustion engine having a cylinder provided with a plurality of intake ports spaced circumferentially in the wall thereof, a single sleeve valve associated with said cylinder and having a combined axial reciprocation and oscillation, said sleeve valve having a plurality of intake ports spaced circumferentially in the wall thereof and adapted to register with the cylinder intake ports when the motion of the sleeve is mainly oscillatory thereby tending to establish swirl of the fuel mixture within the cylinder, fuel mixture conducting means for directing fuel mixture toward said cylinder and sleeve valve intake ports, and means movably responsive to engine speed variation for regulating said swirling tendency.

4. In an internal combustion engine having a cylinder provided with a plurality of intake ports spaced circumferentially in the wall thereof, a single sleeve valve associated with said cylinder and having a combined axial reciprocation and oscillation, said sleeve valve having a plurality of intake ports spaced circumferentially in the wall thereof and adapted to register with the cylinder intake ports when the motion of the sleeve is mainly oscillatory thereby tending to establish swirl of the fuel mixture within the cylinder, fuel mixture conducting means for directing fuel mixture toward said cylinder and sleeve valve intake ports, and means movably responsive to engine throttle valve adjustments for regulating said swirling tendency.

5. In an internal combustion engine having a cylinder provided with a plurality of intake ports spaced circumferentially in the wall thereof, a single sleeve valve associated with said cylinder and having a combined axial reciprocation and oscillation, said sleeve valve having a plurality of intake ports spaced circumferentially in the wall thereof and adapted to register with the cylinder intake ports, fuel mixture conducting means for directing fuel mixture toward said cylinder and sleeve valve intake ports, said fuel mixture having a tendency to swirl in said cylinder, an orifice device, and means for moving said orifice device in response to variations in engine speeds, said orifice device being associated with said conducting means whereby to impart variable directions to said fuel mixture.

6. In an internal combustion engine having a cylinder provided with a plurality of intake ports, valving means for said ports, fuel mixture conducting means for conducting fuel mixture to said intake ports and being at all times in communication with all of said cylinder intake ports, and movable means directing the fuel mixture toward one of said intake ports for controlling swirl in said cylinder at a plurality of engine speeds in the operating power range of the engine.

7. In an internal combustion engine having a cylinder provided with a plurality of intake ports, valving means for said ports, fuel mixture conducting means for conducting fuel mixture to said intake ports, and means actuated in response to variations in engine speeds for selectively directing the fuel mixture toward said intake ports for controlling tendencies of the fuel mixture to swirl in said cylinder.

8. In an internal combustion engine having a cylinder provided with a plurality of intake ports, valving means for said ports, fuel mixture conducting means for conducting fuel mixture to said intake ports, means positioned across at least a portion of the path of the fuel mixture in said conducting means for directing the fuel mixture toward said intake ports for controlling tendencies of the fuel mixture to swirl in said cylinder, and means for adjusting said fuel mixture directing means in said conducting means, said conducting means being open to all of said cylinder intake ports when said fuel mixture directing means is in either of its extreme positions of adjustment.

9. In an internal combustion engine having a cylinder provided with a plurality of intake ports, valving means for said ports, fuel mixture conducting means for conducting fuel mixture to said intake ports, and means selectively directing the fuel mixture in said conducting means toward selective groups of intake ports in accordance with engine speed variations for controlling fuel mixture swirl within said cylinder.

10. In an internal combustion engine having a cylinder provided with a plurality of intake ports, valving means for said ports, a fuel mixture conduit for conducting fuel mixture to said ports, said conduit having an inlet opening substantially symmetrically arranged with respect to said ports, and means for directing the fuel mixture toward said ports in non-symmetrical manner.

11. In an internal combustion engine having a cylinder provided with a plurality of intake ports, valving means for said ports, a fuel mixture conduit for conducting fuel mixture to said ports, said conduit having an inlet opening substantially symmetrically arranged with respect to said ports, and means for directing the fuel mixture toward groups of said ports, and means for shifting said directing means for directing the fuel mixture selectively toward said groups of ports.

12. In an internal combustion engine having a cylinder provided with a plurality of intake ports, valving means for said ports, a fuel mixture conduit for conducting fuel mixture to said ports, said conduit having an inlet opening substantially symmetrically arranged with respect to said ports, and orifice means for directing the fuel mixture toward groups of said ports.

13. In an internal combustion engine having a cylinder provided with a plurality of intake ports, means conducting fluid to said ports, and means associated with said conducting means adapted to selectively direct said fluid toward groups of said ports.

14. In an internal combustion engine of the type inducing swirl of an intake gas prior to combustion, means for conducting said intake gas to said engine, valving means for controlling the introduction of said intake gas from said conducting means to said engine, and means for maintaining said swirl approximately constant over substantially the speed range of the engine.

15. In an internal combustion engine of the type inducing swirl of an intake gas prior to combustion, means for conducting said intake gas to said engine, valving means for controlling the introduction of said intake gas from said conducting means to said engine, and means for maintaining said swirl approximately constant over substantially the speed range of the engine, said last named means including an element movable in response to a variation in engine speed.

16. In an internal combustion engine of the type inducing swirl of an intake gas prior to combustion, means for conducting said intake gas to said engine, valving means for controlling the introduction of said intake gas from said conducting means to said engine, and means for maintaining said swirl approximately constant over substantially the speed range of the engine, said last named means including an element movable in response to a variation in the setting of the engine throttle valve.

17. In an internal combustion engine of the type having a plurality of intake port means and inducing swirl of an intake gas prior to combustion, means for conducting said intake gas to said engine and being in open communication at all times with all of said intake port means, valving means for controlling the introduction of said intake gas from said conducting means to said engine, means for controlling the amount of said swirl at a plurality of engine speeds in the operating power range of the engine, and means for manually adjusting said last named means.

18. In an internal combustion engine of the type having a plurality of intake port means and inducing swirl of an intake gas prior to combustion, means for conducting said intake gas to said engine and being in open communication at all times with all of said intake port means, valving means for controlling the introduction of said intake gas from said conducting means to said engine, and means for variably directing said intake gas toward said valving means at a plurality of engine speeds in the operating power range of the engine, for controlling the amount of said swirl.

19. In an internal combustion engine of the type inducing swirl of an intake gas in amounts tending to increase prior to combustion with increasing engine speed, means for conducting said intake gas to said engine, and means for controlling said tendency for swirl increase, said last named means being effective in response to an increase in engine speed.

20. In an internal combustion engine of the type inducing swirl of an intake gas in amounts tending to increase prior to combustion with increasing engine speed, means for conducting said intake gas to said engine, and means for controlling said tendency for swirl increase, said last named means being effective in response to an increase in engine speed, whereby to permit a degree of swirl at a relatively low engine speed which would otherwise become excessive for a relatively high engine speed.

21. In an internal combustion engine of the type inducing swirl of an intake gas in amounts tending to increase prior to combustion with increasing engine speed, means for conducting said intake gas to said engine, and means for controlling said tendency for swirl increase, said last named means being effective in response to an increase in engine speed whereby to permit a degree of swirl at a relatively low engine speed which would otherwise become excessive for a relatively high engine speed, whereby to provide substantially constant swirl over approximately the speed range of the engine.

22. In an internal combustion engine, means for conducting an intake gas to said engine, valving means for the engine intake, a governor operated by the engine, and means controlled by said governor for deflecting the path of said intake gas.

23. In an internal combustion engine, means for conducting an intake gas to said engine, valving means for the engine intake, a governor operated by the engine, and means controlled by said governor for deflecting the path of said intake gas, substantially in proportion to variations in engine speeds.

24. In an internal combustion engine, means for conducting an intake gas to said engine, valving means for the engine intake, throttle means for said intake gas, and means controlled by said throttle means for deflecting the path of said intake gas.

25. In an internal combustion engine, means for conducting an intake gas to said engine, valving means for the engine intake, throttle means for said intake gas, and means controlled by said throttle means for deflecting the path of said intake gas, substantially in proportion to variations in the throttle setting.

26. In an internal combustion engine, means for conducting an intake gas to said engine, valving means for the engine intake, and means for variably directing the intake gas stream toward the engine intake to promote swirling tendencies in the lower ranges of engine speeds more than in high ranges of engine speeds.

27. In an internal combustion engine of the single sleeve valve combined movement type wherein a cylinder and cooperating sleeve valve are ported for passage of an intake gas, means for moving said sleeve valve to cause said intake gas to enter said cylinder generally tangentially whereby to induce swirl of said intake gas within said cylinder, said swirl having a tendency to increase as the engine speed increases, and means operable in response to variations in engine speed for variably regulating said tangential entry of said intake gas at a plurality of engine speeds in the operating power range of the engine to control said swirl.

28. In an internal combustion engine of the single sleeve valve combined movement type wherein a cylinder and cooperating sleeve valve are ported for passage of an intake gas, means for moving said sleeve valve to cause said intake gas to enter said cylinder generally tangentially whereby to induce swirl of said intake gas within said cylinder, said swirl having a tendency to increase as the engine speed increases, and means variably regulating said tangential entry of said intake gas to progressively oppose the increasing swirl tendency as the engine speed increases.

29. In an engine, means conducting an intake gas thereto, valving means controlling the introduction of said gas to said engine, and means operating at a plurality of engine speeds in the operating power range of the engine for regulably deflecting said gas during travel thereof in said conducting means, said last named means being operable in response to variations in engine speed.

30. In an engine, means conducting an intake gas thereto, valving means controlling the introduction of said gas to said engine, a deflector for said gas, and means for adjusting said deflector to direct the gas toward the engine for producing a swirl promoting tendency therein at minimum engine speed and a swirl opposing tendency at maximum engine speed.

31. In an engine, means including an orifice conducting an intake gas to the engine in a manner to cause the gas to swirl in the combustion chamber, and means for varying the direction of introduction of said gas into the engine to control the swirl thereof, comprising means for shifting said orifice.

32. In an engine, means including an orifice conducting an intake gas to the engine in a manner to cause the gas to swirl in the combustion chamber, and means for varying the direction of introduction of said gas into the engine to control the swirl thereof, comprising means for causing a shifting movement of said orifice in response to engine operation.

33. In an engine, a cylinder structure having an intake chamber and a plurality of gas intake ports associated with said chamber, said chamber having a gas inlet common to said intake ports, means for conducting an intake gas to said common inlet, said gas conducting means being at all times in communication with all of said intake ports, and means associated with said common inlet for regulably deflecting the intake gas entering said chamber.

34. In an engine, a cylinder structure having an intake chamber and a plurality of gas intake ports associated with said chamber, said chamber having a gas inlet common to said intake ports, means for conducting an intake gas to said common inlet, and means associated with said common inlet and adjustable for regulably deflecting the intake gas selectively in opposite directions circumferentially of said cylinder and within said chamber.

ANDRE J. MEYER.